United States Patent [19]

Alaimo

[11] Patent Number: 4,488,187

[45] Date of Patent: Dec. 11, 1984

[54] SERVO CONTROL APPARATUS

[75] Inventor: Ben Alaimo, Campbell, Calif.

[73] Assignee: Syquest Technology, Fremont, Calif.

[21] Appl. No.: 385,105

[22] Filed: Jun. 4, 1982

[51] Int. Cl.³ .......................... G11B 5/55; G11B 5/58; G11B 21/10

[52] U.S. Cl. ........................................ 360/77; 360/78

[58] Field of Search ................................... 360/77, 78

[56] References Cited

U.S. PATENT DOCUMENTS 4,157,577  6/1979  Porter, Jr. et al. .................... 360/77

Primary Examiner—George G. Stellar

Attorney, Agent, or Firm—Fliesler, Dubb, Meyer & Lovejoy

[57] ABSTRACT

Servo control apparatus including a recording head to read first and second servo data bytes stored across a track on opposite sides of a track centerline, a servo demodulator to count the first and second bytes and produce a resultant count representing any offset of the head relative to the centerline, a head positioner to move the head, and a microcomputer which controls the head positioner to position the head in response to the resultant count. The invention is implemented digitally, is simple and inherently compensates for expansion or contraction of the track to accurately center the head.

7 Claims, 5 Drawing Figures

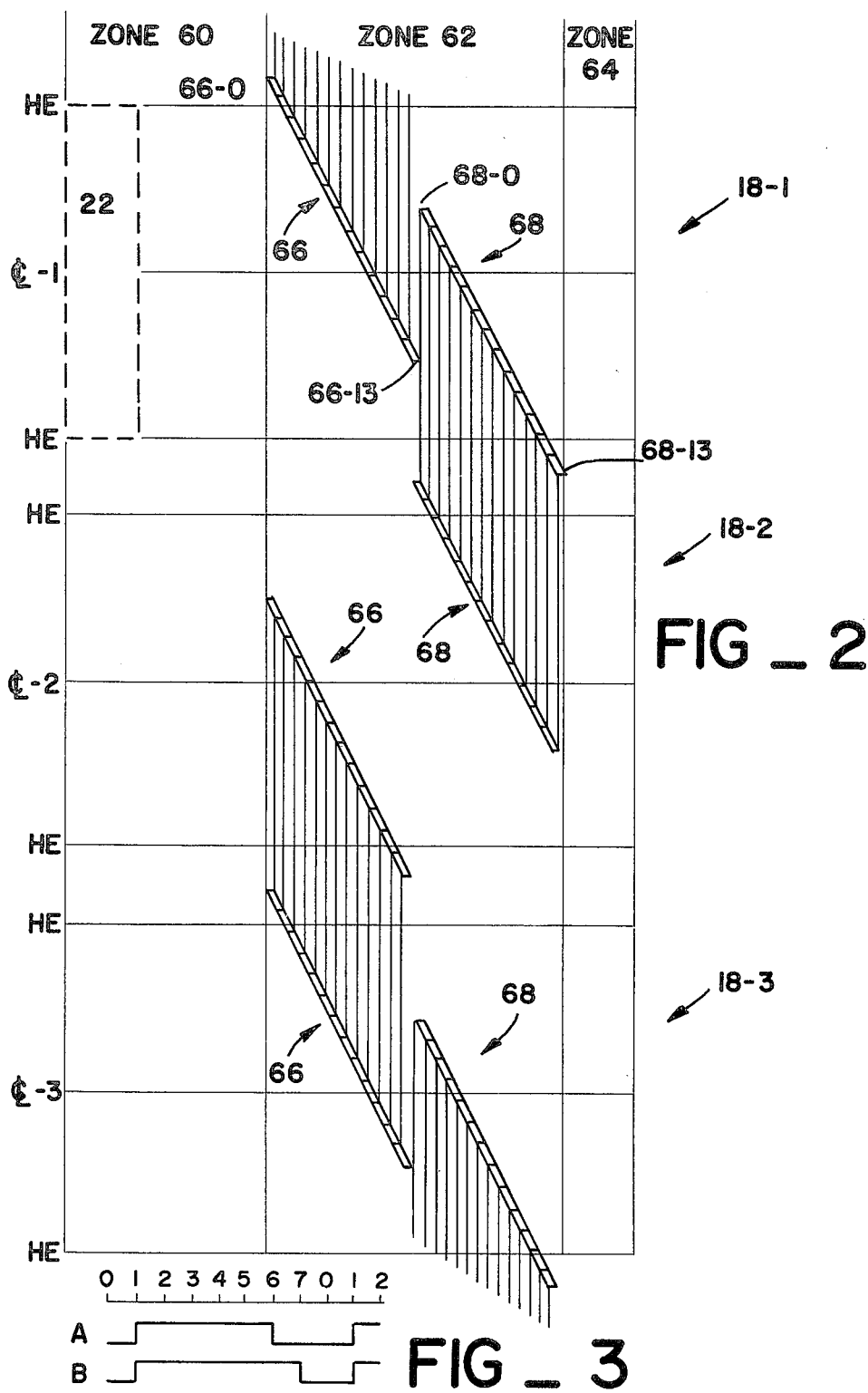

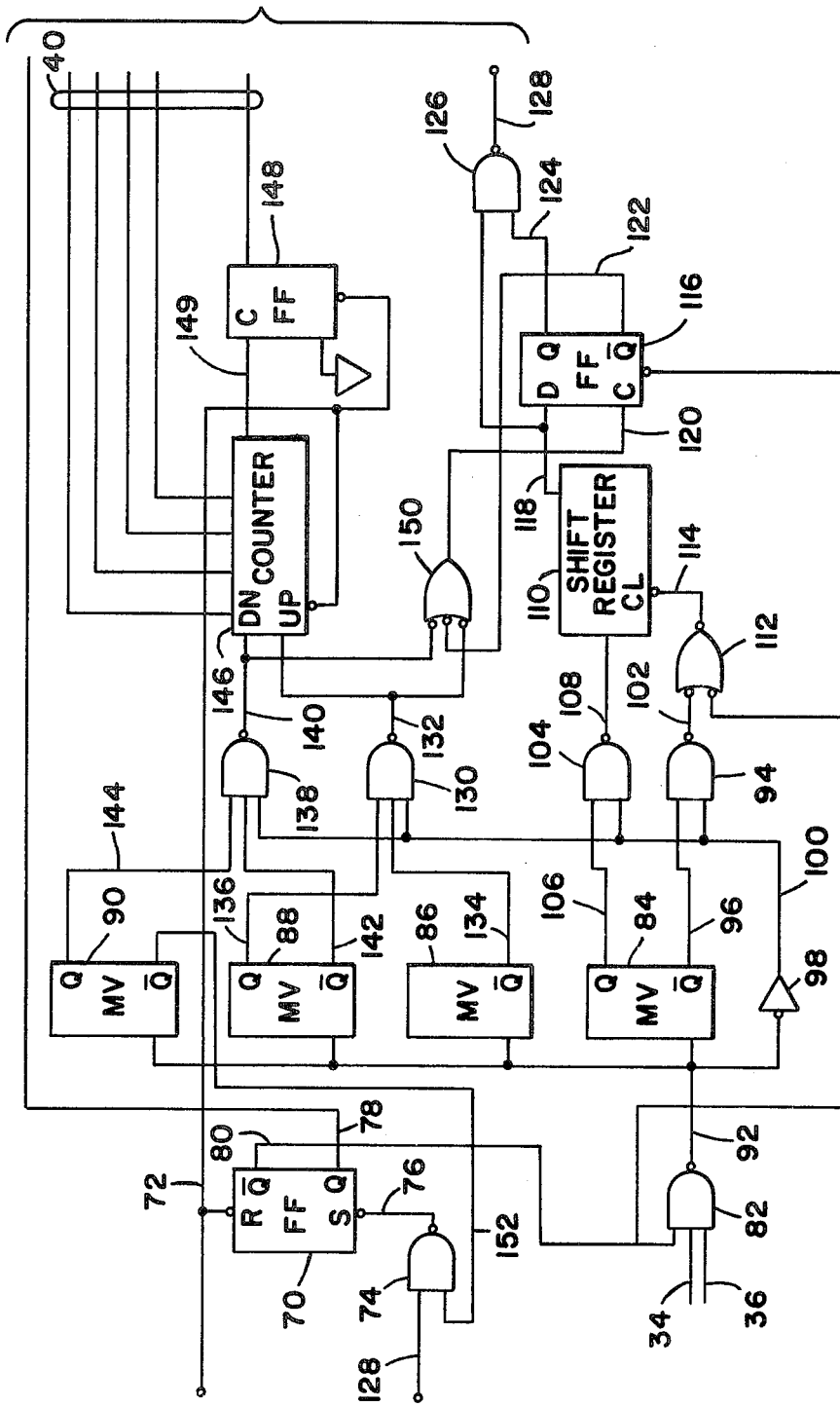
FIG_4

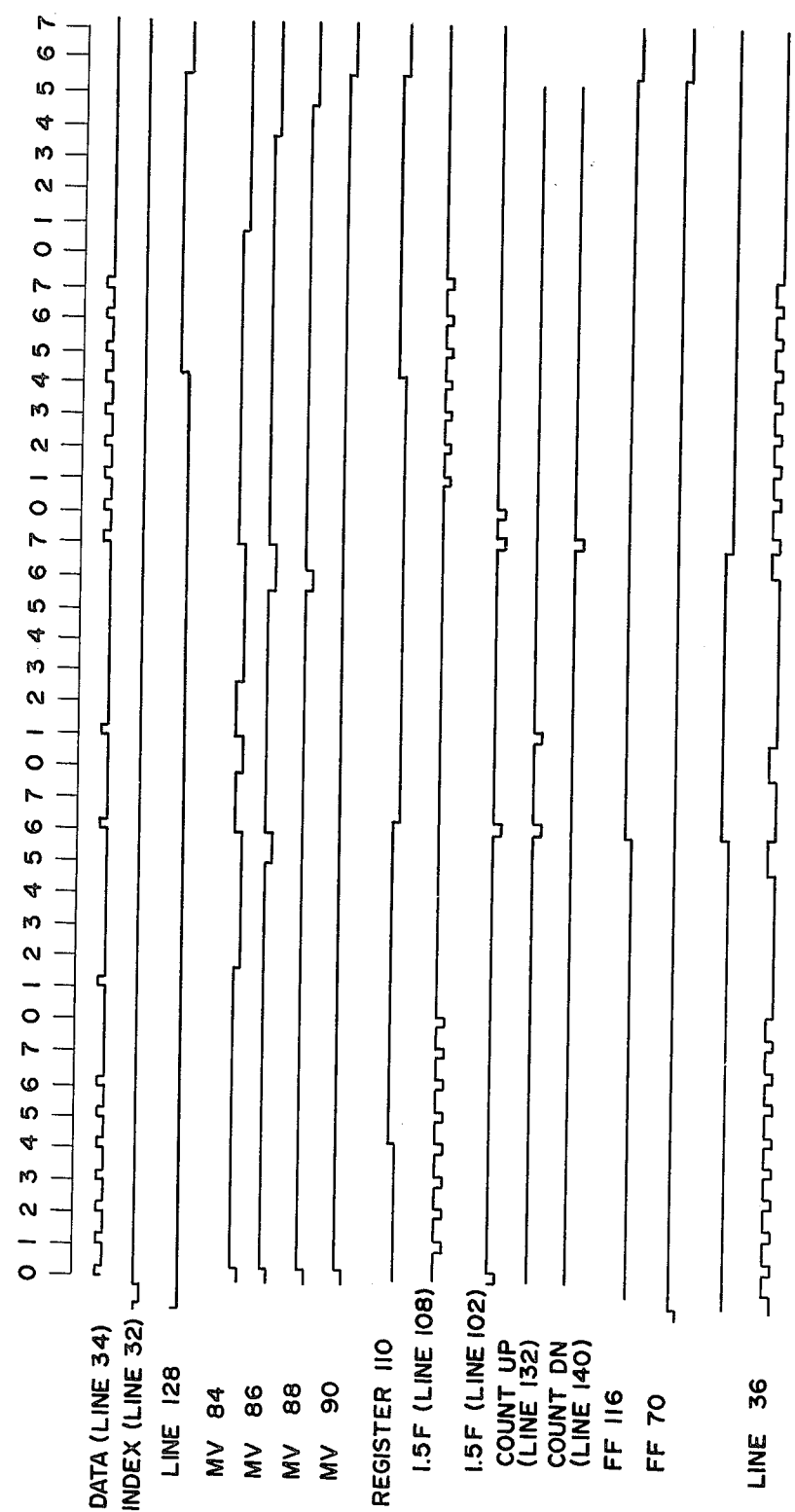
FIG_5

SERVO CONTROL APPARATUS

DESCRIPTION

1. Technical Field

The present invention relates generally to servo control apparatus and, more particularly, to servo control apparatus for use in relation to a data storage medium.

2. Background Art

In the field of data processing, data are stored on and retrieved from a data storage medium. Typically, the storage medium has at least one data track on which data are written or read by a recording head, while a servo control mechanism precisely positions the head relative to the track. One specific example of a data storage and retrieval system is a disk drive which includes at least one data storage disk having a plurality of concentric data tracks, a read/write recording head to read or write data on a selected track, and a servo control system to cause the recording head to seek to the selected track and then precisely center the head over the track. Appropriately stored servo data provide information for seeking the selected track and for maintaining the recording head centered on the track.

Various types of servo control systems and servo data are employed to carry out the abovementioned functions. A common problem with the prior servo control systems, particularly those portions which are used to maintain the recording head centered on a selected track, is that they employ analog design concepts requiring additional components such as an automatic gain control to maintain accurate centering of the recording head relative to the track centerline. Furthermore, the prior servo data, particularly that stored for maintaining the recording head centered on the track, are relatively complicated and involved. Another disadvantage is that the prior servo control system and/or servo data usually include additional components, servo data and algorithms to compensate for the effects of temperature and/or humidity on the storage medium that cause the tracks to expand or contract relative to one another. Yet another disadvantage is that all of the above increases the complexity and cost of an overall servo control system needed to maintain the recording head precisely centered on a track.

The present invention is directed to overcoming one or more of the problems as given above.

DISCLOSURE OF THE INVENTION

In one aspect, the present invention includes servo control apparatus for use in relation to a track of a data storage medium, the track having a centerline and servo data including a plurality of first servo data being stored across the track at substantially one side of the centerline and a plurality of second servo data being stored across the track at substantially the other side of the centerline, the apparatus comprising means for reading the plurality of first servo data and the plurality of second servo data, means for counting the plurality of first servo data and the plurality of second servo data being read and for producing a count representing the position of the reading means relative to the track centerline, controllable means for positioning the reading means and means for controlling the controllable means in response to the count.

In another aspect, the present invention includes a data storage medium comprising a data storage surface including a track having a centerline, and servo data including a plurality of first servo data being stored across the track at substantially one side of the centerline and a plurality of second servo data being stored across the track at substantially the other side of the centerline.

Prior servo control systems are based on analog design concepts, complicated, expensive and must provide additional circuit features to compensate for temperature and humidity changes. The present invention is substantially all digital, simple, inexpensive and inherently compensates for such temperature and humidity changes.

BRIEF DESCRIPTION OF THE DRAWINGS

FIG. 2 is an illustration of servo data of the present invention;

FIG. 3A and FIG. 3B illustrate servo data bytes;

FIG. 4 is a schematic of a servo demodulator; and

FIG. 5 is a timing diagram used to explain the servo demodulator.

DETAILED DESCRIPTION OF THE PREFERRED EMBODIMENT

Figure 1:
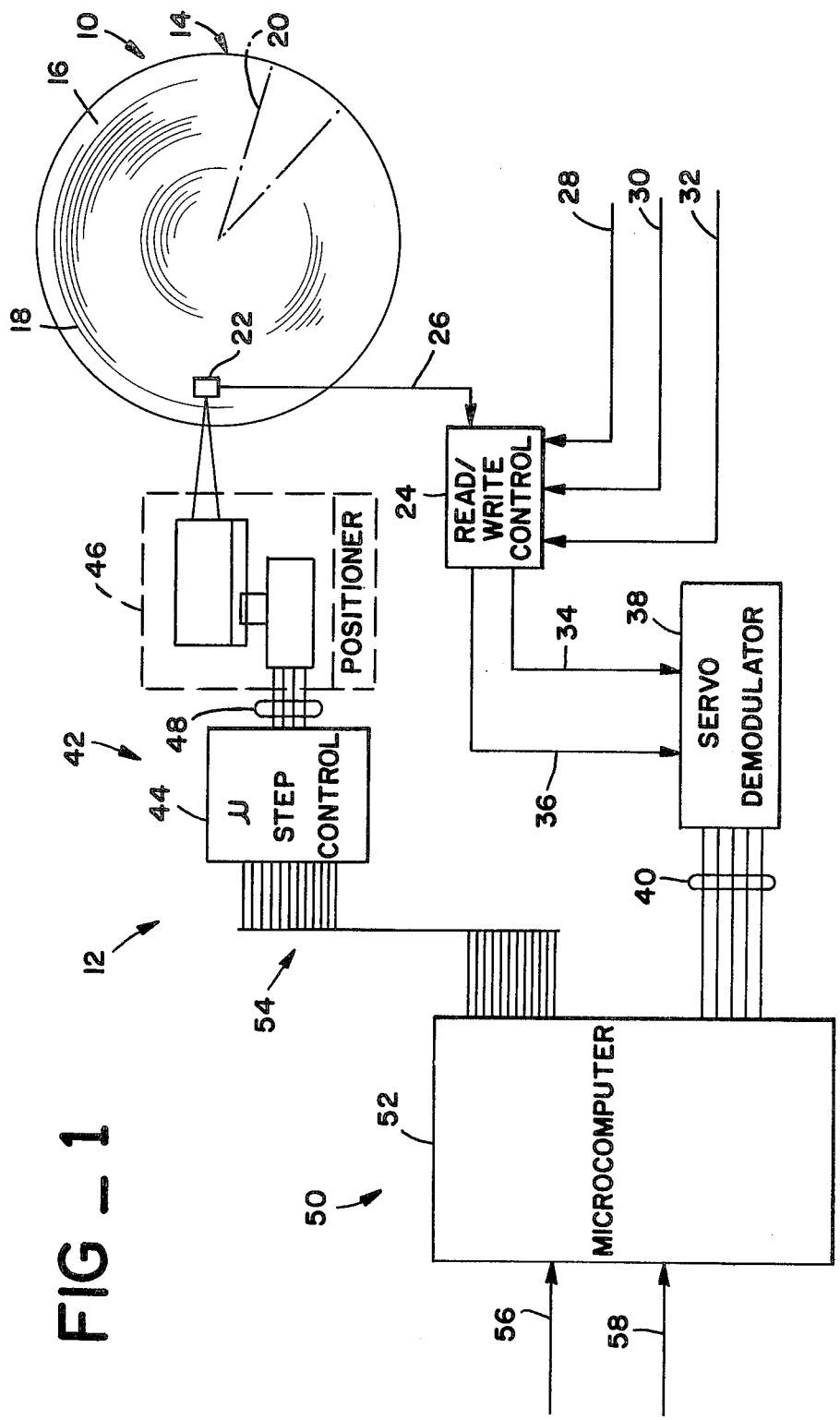
FIG. 1 is a block diagram of one embodiment of the present invention.

FIG. 1 illustrates a data storage medium 10 and a servo control apparatus or circuit 12 for use in relation to the storage medium 10. While the principles of the present invention can be applied to a number of different data storage media, as one example the storage medium 10 is a rotatable disk 14 having a data storage surface 16. A plurality of concentric tracks 18 for storing data are on the data surface 16, together with a sector 20 that stores servo data for each of the tracks 18 in accordance with the present invention, as will be further described.

The servo control circuit 12 includes a recording head 22 coupled to a conventional read/write control circuit 24 via a line 26 for reading or writing data. Control circuit 24 controls recording head 22 to read or write data on data surface 16 in response to conventional write data, write gate and read data control signals received on line 28, line 30 and line 32, respectively. When reading the servo data stored in sector 20 on surface 16, the outputs of control circuit 24 are digital data on a line 34 representing the servo data being read and a digital DC threshold signal on a line 36 indicating that, for example, data and not noise are being read.

A servo demodulator 38 has a data input and a threshold signal input connected, respectively, to output line 34 and line 36 of the read/write control circuit 24. As will be further described, servo demodulator 38 demodulates the servo data stored in sector 20 on a given track 18 and produces digital data on output lines shown generally at 40 that have information about the position of recording head 22 relative to the center of the given track 18.

A controllable circuit 42 for controlling the radial position of recording head 22 across data surface 16 includes a microstep control motor 44 connected to a head positioner 46 via control lines shown generally at 48. A data processor 50, such as a programmable microcomputer or microprocessor 52, responds to the digital data on line 40 by generating microstep control STATES on output lines shown generally at 54 that control the energization of motor 44. Microcomputer 52 also can receive conventional seek pulses on a line 56 and conventional directional data on a line 58 also to control motor 44 by generating control STATES on line 54.

In the operation of servo control circuit 12, generally, microcomputer 52 first will respond to the seek pulses on line 56 and the directional data on line 58 to generate the control STATES on line 54. Motor 44, in response to these control STATES on line 54, will be energized to drive head positioner 46 and, thereby, to cause head 22 to seek to a desired track 18. When head 22 is at the desired track 18, the seek operation ceases and the head 22 should be substantially centered over the desired track 18.

Thereafter, as disk 14 rotates, the servo data of sector 20 for the desired track 18, which provides information for the precise centering of head 22 over such a track 18, is read by head 22 and read/write control circuit 24. Servo demodulator 38 then demodulates the information on line 34 and line 36 to produce the digital data on line 40. In response to this data on line 40, microcomputer 52, under software control, generates microstep control STATES on line 54, whereby motor 44 will move head positioner 46 until head 22 is precisely centered over the desired track 18.

FIG. 2 illustrates the servo data stored in sector 20 and, in particular, the servo data for three adjacent tracks 18-1, 18-2 and 18-3. Each track 18-1 to 18-3 has a centerline C/L-1 to C/L-3, respectively. Also shown in dotted lines is the recording head 22 being precisely centered over track 18-1. As one example, the centerline-to-centerline distance of two adjacent tracks is 2.3 mls. and the width of head 22 is 1.8 mls.

Sector 20, for each track 18, is divided into three zones 60, 62 and 64. The first zone 60 is called a 2F Zone having, for example, 30 bytes (not shown) and the third zone 64 is also called a 2F Zone having, for example, 6 bytes (not shown). The bytes stored in zone 60 and zone 64 represent, respectively, the start and end of the sector 20 for the particular track 18.

The intermediate zone 62 is called the Servo Data Zone and stores the servo data that have information for precisely centering head 22 on a given track 18. The servo data of zone 62 include, for each track 18, a plurality of servo data 66 and a plurality of servo data 68. There are, for example, fourteen bytes of servo data 66 numbered 66-0 to 66-13 and fourteen of servo data 68 numbered 68-0 to 68-13. More particularly, and, for example, with respect to track 18-1, the plurality of servo data 66 extend from partially outside one side of track 18-1 or end of head 22, substantially across one side of the centerline C/L-1 of track 18 and partially to the other side of centerline 18-1. The plurality of servo data 68 extend from partially the one side of centerline C/L-1, substantially across the other side of centerline C/L-1 and partially outside the other side of track 18-1 or other end of head 22. As illustrated, the plurality of servo data 66 and plurality of servo data 68 extend in parallel across track 18-1 and at an angle to the centerline C/L-1.

Note that the plurality of servo data 66 and plurality of servo data 68 on alternate tracks, i.e., track 18-1 and track 18-3, extend on the same side of the respective centerlines C/L-1, C/L-3. The servo data 66 and servo data 68 on the intermediate track 18-2 extend on the opposite side of centerline C/L-2, as shown. This alternate pattern, which is repeated for all tracks 18, facilitates the writing of the servo data in sector 20.

FIG. 3A illustrates a typical one of the bytes of servo data 66, e.g. byte 66-0, and FIG. 3B illustrates a typical one of the bytes of servo data 68, e.g. byte 68-0. For reasons which will become apparent, the bytes of servo data 66 are different than the bytes of servo data 68. Specifically, the representative byte 66-0 shown in FIG. 3A is an 8-bit byte which is high for bits 1-6 and then is low for bits 7-8. However, the representative byte 68-0 shown in FIG. 3B is high for bits 1-7 and low for bit 8. Consequently, the plurality of servo data 66 can be distinguished from the plurality of servo data 68.

The manner in which the plurality of servo data 66 and the plurality of servo data 68 provide information for the precise centering of head 22 relative to a given track 18 such as track 18-1 is as follows. If the head 22 is precisely centered, as shown in FIG. 2, then as the servo data 66 are read by head 22 a total of twelve bytes 66-2 to 66-13 will be counted. Then, as the servo data 68 are read by head 22, a total of twelve bytes 68-0 to 68-11 also will be counted. The two equal counts or zero difference in count represent the exact centering of the head 22.

Assume now that the head 22 is slightly off center by two bytes toward the top as viewed in FIG. 2, such that head 22 first reads all fourteen bytes 66-0 to 66-13 of servo data 66. Then, head 22 will read only ten bytes 68-0 to 68-9 of servo data 68. The inequality of the count represents an off-center position of head 22. Also, as will be further described, the fact that more bytes of servo data 66 than bytes of servo data 68 are counted indicates that head 22 is off center towards the top of FIG. 2 and, therefore, that head 22 should be moved downwardly to the centered position.

It will be seen that any unequal count or difference in count represents an off-centered position of head 22. The magnitude of the difference represents the amount that head 22 is off center, while the sign (+or −) represents the direction that head 22 has to be moved to reach the centered position.

FIG. 4 shows the schematic of servo demodulator 38 which also will be described in connection with the timing diagram of FIG. 5. A flip-flop 70 has a reset input R connected to a line 72 carrying an index pulse and a set input S connected to the output of a NAND gate 74 over a line 76. Flip-flop 70 has an output Q coupled to a line 78 which carries a sample signal and an output $\bar{Q}$ coupled to a line 80.

A NAND gate 82 has one input connected to line 80, a data input connected to the line 34 and a threshold input connected to the line 36, the latter two being shown in FIG. 1. Four one-shot multivibrators 84, 86, 88 and 90 each have a trigger input connected to the output of NAND gate 82 over a line 92. Multivibrator 84 has a time constant of 1.5 bit times and is used as a digital filter to detect the 2F zone 60 and the 2F zone 64. Multivibrator 86 has a time constant of 4.5 bit times and is used as a digital filter to detect the plurality of servo data bytes 66. Multivibrator 88 has a time constant of 5.5 bit times and is used as a digital filter to detect the plurality of servo data bytes 68. Multivibrator 90 has a time constant of 6.5 bit times and is used as a digital filter to detect the absence of bits or pulses within this bit time.

A NAND gate 94, which is used to detect a bit rate <1.5F, has one input connected to the output $\bar{Q}$ of multivibrator 84 over a line 96 and another input coupled to the output of an inverter 98 over a line 100, the input to the inverter 98 being coupled to line 92. The output of gate 94 is produced on a line 102. A NAND gate 104, which is used to detect a bit rate >1.5F, has one input connected over a line 106 to the output Q of multivibrator and the other input coupled to the line 100. The output of gate 104 is produced on a line 108.

A 4-bit shift register 110 is cleared by the output of a NOR gate 112 over a line 114, in which the gate 112 has one input connected to line 80 and another input connected to line 102. Bits are shifted into shift register 110 via an input connected to line 108. A flip-flop 116 has an enabling input coupled to line 80, a data input connected to the output of shift register 110 over a line 118 and a clock input connected to a line 120. An output $\overline{Q}$ of flip-flop 116 is produced on a line 122 while the output Q is produced on a line 124. An And gate 126 has one input connected to line 118 and another input connected to line 124. The output of gate 126 on a line 128 is a datum signal indicating the presence of the 2F zone 64.

A NAND gate 130 has an output on a line 132 each time one of the plurality of servo data bytes 66 is read by head 22. Gate 130 has one input connected to line 100, a second input coupled to an output $\overline{Q}$ of multivibrator 86 on a line 134 and a third input coupled to an output Q of multivibrator 88 over a line 136.

A NAND gate 138 produces an output on a line 140 each time one of the plurality of servo data bytes 68 is read by head 22. Gate 138 has one input connected to line 100, a second input connected to an output $\overline{Q}$ of multivibrator 88 over a line 142 and a third input connected to an output Q of multivibrator 90 via a line 144.

An up/down counter 146 has a count-up input connected to line 132 and a count-down input connected to line 140. Counter 146 is incremented with each pulse on line 132 and decremented with each pulse on line 140. A flip-flop 148 conventionally stores the borrow bit from counter 146 via a line 149. Counter 146 and flip-flop 148 are cleared by the index pulse on line 72.

Counter 146 and flip-flop 148 together produce a 5-bit output on the lines shown generally at 40 (see FIG. 1). This count on lines 40 is information of the position of the head 22 relative to a centerline C/L of a track 18.

An Or gate 150, whose output is produced on line 120, has one input connected to line 122, a second input connected to line 132 and a third input connected to line 140. Finally, NAND gate 74 has one input connected to line 128 and another input connected to the output $\overline{Q}$ of multivibrator 90 over a line 152.

In operation, and with reference to FIG. 5, when a conventional index (not shown) is detected once each revolution of disk 14, the resulting low index pulse on line 72 resets flip-flop 70 and clears counter 146 and flip-flop 148. The logic 1 now on line 80 from flip-flop 70 clears shift register 110 via NOR gate 112 and enables flip-flop 116.

Then, as the servo data sector 20 rotates to be read by head 22, first the 2F zone 60 having thirty bytes is detected. When the threshold signal on line 36 goes to logic 1, as shown in FIG. 5, and with the logic 1 being on line 80, then when each byte of 2F data in the zone 60 is read and a corresponding pulse or logic 1 produced on 34, as shown in FIG. 5, the output of NAND gate 82 on line 92 goes high at the trailing edge of such pulse to trigger each multivibrator 84, 86, 88 and 90. With multivibrator 84 being so triggered, as shown in FIG. 5, the output $\overline{Q}$ on line 96 is logic 0 to disable NAND gate 94 and the output Q on line 106 is logic 1 to enable NAND gate 104.

Then, each logic 1 on line 34 produces a pulse or bit on line 108, via gate 82, line 92, inverter 98, line 100 and gate 104, which is shifted into register 110. After four such bits are shifted into register 110, the output of register 110 on line 118 goes high for a first time, thereby indicating the presence of the 2F zone 60.

As can be seen from the timing diagram of FIG. 5, if there is less than 1.5F data being read by head 22, then multivibrator 84 will time out, producing a logic 1 on line 96 to enable NAND gate 94 and a logic 0 on line 106 to disable NAND gate 104. When a pulse from the <1.5F data appears on line 34, register 110 is cleared via gate 82, line 92, inverter 98, line 100, gate 94, line 102, gate 112 and line 114.

Assume now that the servo data zone 62 is being read. More particularly, assume that any one byte of the plurality of servo data bytes 66 is being read. With reference to the timing diagram of FIG. 5, at the time of the trailing edge of the sixth bit of this one byte, NAND gate 130 has a logic 1 input on line 134, a logic 1 input on line 136 and a logic 1 input on line 100. Consequently, the output of gate 130 on line 132 goes to logic 0 and counter 146 is incremented. In other words, multivibrator 86 and multivibrator 88 provide a window via the logic 1 on line 134 and logic 1 on line 136 during which bit six of the byte can be detected.

Then, as the next byte of the plurality of servo data bytes 66 is read, when the pulse corresponding to the sixth bit appears at line 34, the same operation will occur so that counter 146 again is incremented. Therefore, it can be seen that as each byte of the plurality of servo data bytes 66 is read by head 22, counter 146 will be incremented. This continues until head 22 no longer reads the plurality of servo data bytes 66 in the servo data zone 62, resulting in a count representing the total number of such bytes being read.

Next, head 22 will begin to read the plurality of servo data bytes 68. At the time of the seventh bit of any one such byte being read, NAND gate 138 has a logic 1 input on line 142, a logic 1 input on line 144 and a logic 1 on line 100. Therefore, the output of gate 138 on line 140 goes to logic 0 to decrement the up/down counter 146. In other words, multivibrator 88 and multivibrator 90 provide a window via the logic 1 on line 142 and the logic 1 on line 144 during which bit seven of this byte can be detected. This operation of decrementing counter 146 at the time of reading the seventh bit of each byte of the plurality of servo data bytes 68 continues until the 2F servo zone 64 is about to be read. Thus, counter 146 counts down a total number equal to the number of servo data bytes 68 read by head 22. Consequently, at the end of reading the plurality of servo data bytes 66 and the plurality of servo data bytes 68, counter 146, together with the borrow flip-flop 148, produce a count or digital number on lines 40 representing any difference in number of such servo data bytes counted and, hence, any offset of head 22 relative to the centerline C/L of a given track 18. The magnitude of this count represents the amount of offset of head 22 from the centerline C/L, while the sign (+or −) represents whether more or less servo data bytes 66 than servo data bytes 68 were counted and, hence, the direction of the offset from the centerline C/L.

Next, note from the timing diagram that when the sixth bit of the first of the plurality of servo data bytes 66 is detected, the logic 1 on line 118 is set or clocked into flip-flop 116 via the pulse on line 132 being gated through NOR gate 150 onto line 120. At this time also, shift register 110 is cleared, as previously described. Consequently, during the time that the plurality of servo data bytes 66 and servo data bytes 68 in the zone 62 are being counted flip-flop 116 is set with a logic 1 being produced on line 124.

Thereafter, when the 2F zone 64 is read by head 22, bits will be shifted into shift register 110 from the output of NAND gate 104 in the manner previously described when reading the 2F zone 60. When the fourth such bit is shifted into register 110 the output on line 118 goes to logic 1. And gate 126 is now enabled by the logic 1 on line 124 and on line 118 to produce a logic 1 on line 128, thereby indicating the reading of the 2F zone 64 and completion of the counting of the plurality of servo data bytes 66 and servo data bytes 68.

And gate 74 now has a logic 1 input on line 128 and, when multivibrator 90 times out, a logic 1 on line 152. Therefore, the output of gate 74 on line 76 sets flip-flop 70 which provides a logic 1 on line 78 and a logic 0 on line 80. The logic 1 on line 78 is received by microcomputer 52 to indicate that count data are available from counter 146 and flip-flop 148. Microcomputer 52 then reads this count data on lines 40 and, under software control, produces the control STATES on lines 54 to cause positioner 42 to precisely center head 22 over the centerline C/L, as is needed.

The above-described operation is repeated each time the index pulse is generated on line 72 and for each track 18 for which head 22 should be accurately centered.

INDUSTRIAL APPLICABILITY

In the overall operation of the present invention, in response to the seek pulses on line 56 and directional data on line 58, microcomputer 52 produces the control pulses on line 54 that ultimately cause recording head 22 to be moved or positioned over a desired track 18. Then, as head 22 reads zone 60, shift register 110 of servo demodulator 38 produces a first logic 1 on line 118. Next, as zone 62 is read, the logic 1 on line 118 is clocked into flip-flop 116. When head 22 has completed reading zone 62, counter 146 and flip-flop 148 provide the count data on lines 40 indicating the position of head 22 relative to the centerline C/L of the desired track 18.

Then, when head 22 reads the zone 64, shift register 110 produces another logic 1 on line 118, resulting in gate 126 and then gate 74 to be enabled. Flip-flop 70 is thus set to inform microcomputer 52 to sample the count data on lines 40. Microprocessor 52, under software control as would be known to one skilled in the art, then produces the control STATES on line 54, ultimately causing head 22 to be centered accurately over the desired track 18.

In summary, the present invention is implemented entirely digitally, thereby not requiring, for example, an analog automatic gain control component. The plurality of servo data 66 and plurality of servo data 68 constitute a relatively simple servo data scheme, requiring only the simple function of counting this data for accurate centering purposes. Moreover, any expansion or contraction of the tracks 18 due to, for example, temperature or humidity, will be inherently compensated for since the same resultant count will be produced by counter 146 and flip-flop 148 irrespective of such expansion or contraction. Finally, the present invention overall is simple, resulting in a reduced cost servo control system.

Other aspects, objects and advantages of the invention can be obtained from a study of the drawings, the disclosure and the appended claims.

I claim:
1. A servo control system, comprising:
    (a) a data storage medium having a plurality of data storage tracks, each one of said tracks having a centerline, a servo sector and servo data in said servo sector including a plurality of first servo data being stored across said one track at substantially one side of said centerline and a plurality of second servo data being stored across said one track at substantially the other side of said centerline;
    (b) positionable means for reading said plurality of first servo data and said plurality of second servo data and for generating first pulses representing said first servo data, respectively, and for generating second pulses representing said second servo data, respectively;
    (c) a mechanical means for rotating said data storage medium relative to said positionable means;
    (d) means, responsive to said mechanical means, for generating an index signal indicating a rotation of said data storage medium, said servo sector being aligned to coincide with said index signal during said rotation;
    (e) means, responsive to said index signal, for counting in one direction said first pulses and for counting in another direction said second pulses and for storing a count representing the difference between said first pulses and said second pulses;
    (f) programmable processing means for generating position control data in response to said count; and
    (g) means for positioning said positionable means in response to the position control data.

2. A servo control system according to claim 1 wherein each of said plurality of first servo data comprises a first byte and each of said plurality of second servo data comprises a second byte being different from said first byte.

3. A servo control system according to claim 1 wherein said means for counting and for storing comprises:
    (a) first means for generating a first window to detect said first pulses;
    (b) second means for generating a second window to detect said second pulses; and
    (c) an up/down counter, connected to said first and second generating means, for receiving said first and said second pulses.

4. A servo control system according to claim 1 wherein said programmable data processing means comprises a microcomputer.

5. The apparatus of claim 1, wherein:
    said data storage medium rotates around a center,
    said servo sector includes said servo data for each said plurality of data storage tracks, and
    said servo sector is written on said data storage medium in substantially a column extending radially outward from the center of said data storage medium.

6. The apparatus of claim 5, wherein:
    said first servo data for a first of said plurality of data storage trackes is stored across the said centerline of said first track at substantially the outside of said centerline of said first track, and said second servo data is stored across said centerline of said first track at substantially the inside of said centerline of said first track, and a second of said plurality of data storage tracks is adjacent to and inside of said first track, said second servo data for said first track being stored so that it extends across said centerline of said second track and substantially outside said second track, and said first servo data for said second track being stored across said centerline of said second track at substantially the inside of said second track.

7. A servo control system, comprising:
(a) a data storage disk having a plurality of concentric data storage tracks, each one of said tracks having a centerline, a servo sector and servo data in said servo sector, said servo data including in sequence a first zone of servo data, a second zone of servo data having a plurality of first data bytes being stored across said one track at substantially one side of said centerline and a plurality of second data bytes being stored across said one track at substantially the other side of said centerline, and a third zone of servo data;
(b) positionable means for reading said servo data;
(c) a mechanical means for rotating said data storage medium relative to said positionable means;
(d) means, responsive to said mechanical means, for generating an index signal indicating a rotation of said data storage medium, said servo sector being aligned to coincide with said index signal during said rotation;
(e) detecting means, responsive to said index signal and connected to said positionable means, for detecting said servo data of said first one and said servo data of said third zone;
(f) means, connected to said positionable means, for counting in one direction said plurality of first data bytes being read and for counting in the other direction said plurality of second data bytes being read and for storing a resultant count representing the position of said positionable means relative to said centerline;
(g) means, connected to said detecting means, for generating a sample data signal in response to detecting said third zone of data;
(h) data processing means for receiving said resultant count in response to said sample data signal and for generating a position control signal in dependence on the resultant count; and
(i) controllable means for positioning said positionable means in response to said position control signal.

* * * * *

UNITED STATES PATENT AND TRADEMARK OFFICE
CERTIFICATE OF CORRECTION

PATENT NO. : 4,488,187
DATED : December 11, 1984
INVENTOR(S) : BEN ALAIMO

It is certified that error appears in the above-identified patent and that said Letters Patent is hereby corrected as shown below:

Column 8, line 65, "trackes" should be --tracks--.

Column 10, lin 8, "one" should be --zone--.

Signed and Sealed this

Sixth Day of August 1985

[SEAL]

Attest:

DONALD J. QUIGG

Attesting Officer     Acting Commissioner of Patents and Trademarks